United States Patent [19]

Hügel et al.

[11] Patent Number: 4,993,900

[45] Date of Patent: Feb. 19, 1991

[54] ANCHOR MEMBER SECURED IN PLACE BY A PERMANENTLY HARDENABLE MASS

[75] Inventors: Robert Hügel, Kaufering; Erich Leibhard, Munich, both of Fed. Rep. of Germany

[73] Assignee: Hilti Aktiengesellschaft, Fürstentum, Liechtenstein

[21] Appl. No.: 37,139

[22] Filed: Apr. 9, 1987

Related U.S. Application Data

[63] Continuation of Ser. No. 752,916, Jul. 8, 1985, abandoned.

[30] Foreign Application Priority Data

Jul. 6, 1984 [DE] Fed. Rep. of Germany ....... 3425041

[51] Int. Cl.[5] ............................................. F16B 37/02
[52] U.S. Cl. .................................................... 411/82
[58] Field of Search .................. 411/60, 61, 82, 475, 411/59, 71, 72, 73, 74, 103, 107, 108, 111, 112, 148, 166, 170, 173, 174, 175, 178, 187, 477, 548; 248/231.9, 231.91; 52/704, 707, 744; 405/261

[56] References Cited

U.S. PATENT DOCUMENTS

| | | | |
|---|---|---|---|
| 757,226 | 4/1904 | Reininger | 411/498 |
| 868,070 | 10/1907 | Boles | 411/16 |
| 917,927 | 4/1909 | Cook | 411/82 X |
| 1,062,992 | 5/1913 | Newhall, Jr. et al. | 411/61 |
| 1,066,471 | 7/1913 | Daniels | 411/451 |
| 1,564,947 | 12/1925 | Copeman | 52/704 |
| 2,880,830 | 4/1959 | Rohe | 52/704 X |
| 3,504,723 | 4/1970 | Cushman et al. | 411/82 |
| 4,044,512 | 8/1977 | Fischer et al. | 52/127 |
| 4,129,007 | 12/1978 | Rausch | 411/378 X |
| 4,132,080 | 1/1979 | Hansen | 411/548 X |
| 4,322,183 | 3/1982 | Ciavatta | 405/261 |
| 4,363,581 | 12/1982 | Pease | 411/82 |
| 4,497,524 | 2/1985 | Levings, Jr. et al. | 411/378 X |

FOREIGN PATENT DOCUMENTS

| | | | |
|---|---|---|---|
| 2437308 | 2/1976 | Fed. Rep. of Germany | 411/71 |
| 2838466 | 3/1980 | Fed. Rep. of Germany | 411/82 |
| 2347560 | 11/1977 | France | 411/72 |
| 2420 | of 1912 | United Kingdom | 411/72 |

Primary Examiner—Rodney M. Lindsey
Attorney, Agent, or Firm—Toren, McGeady & Associates

[57] ABSTRACT

An anchor member to be fixed in a borehole by a permanently hardenable mass is formed as a sleeve-like member with the outside surface deformed inwardly at axially and circumferentially spaced areas so that the inside surface is deformed into a multi-sided cross-section. The inside surface can be four-sided with the inwardly deformed areas increasing the anchoring effect and preventing turning of the member when a fastening element is threaded into its trailing end. The sleeve-like member is closed at its leading end to avoid the hardenable mass from flowing into the member.

5 Claims, 1 Drawing Sheet

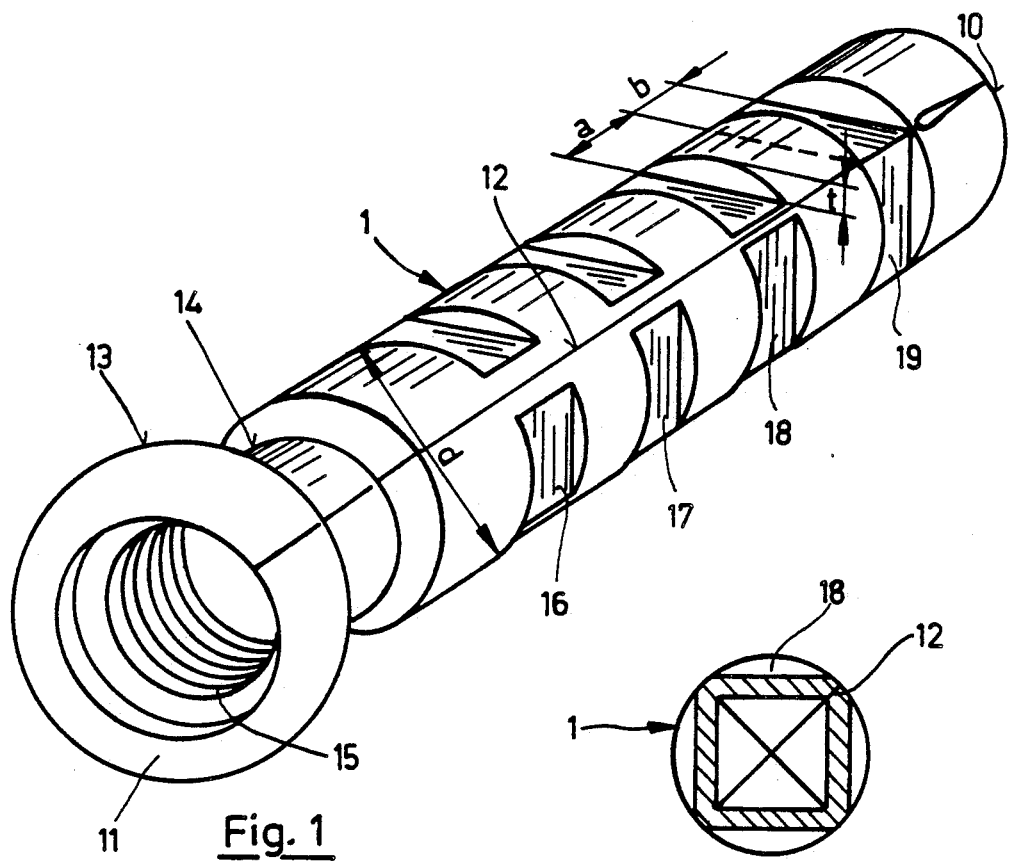
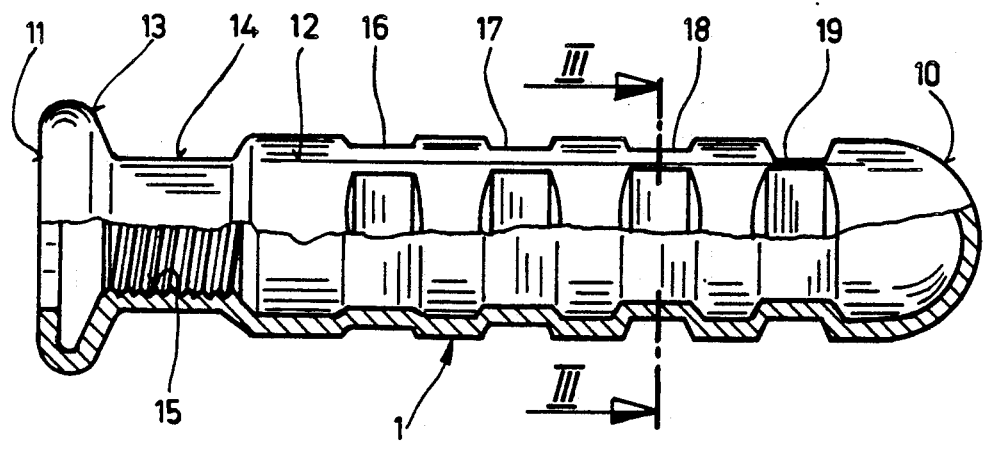

ANCHOR MEMBER SECURED IN PLACE BY A PERMANENTLY HARDENABLE MASS

This is a continuation of application Ser. No. 752,916, filed July 8, 1985, now abandoned.

BACKGROUND OF THE INVENTION

The present invention is directed to a sleeve-shaped anchor member arranged to be fixed in a borehole by a permanently hardenable mass and the anchor member is provided with inwardly deformed areas at least over a portion of its axial length.

Anchor members securable by a permanently hardenable mass are used for many applications because of their advantages, such as the absence of expansion pressure, good durability on exposure to chemical and other external influences and because of a relatively simple installation procedure. Such known anchor members have not, however, been usable or have not afforded satisfactory service over long periods of time.

Until the present time there have been two different types of anchor members used. Where the anchor members are provided with external threads, as a rule, initially all of the hardenable mass is introduced into the borehole and then the anchor member is driven into the mass within the borehole with a rotational and/or percussion movement.

Where the anchor member is provided with internal threads so that a load attachment can be effected by a fastening element such as a screw, a threaded bolt, a threaded stud or the like, in most instances the anchor member is inserted into the borehole and then the hardenable mass is injected through the anchor members or directly into the annular space located between the anchor member and the borehole surface. Another possibility involves using a screen filled with the hardenable mass before insertion into the borehole. The mass is squeezed out of the screen or enclosure when the anchor member is inserted into the screen. Such a process is relatively cumbersome and results in problems, particularly with hardenable masses of low viscosity, that is, a very sticky mass. In both types of anchors there is a problem in obtaining an adequate positive lock or engagement of the anchor member in the hardenable mass. In addition, the inside thread in the anchor member can be clogged during the injection of the mass rendering the member unusable.

After the mass has partially or completely hardened, a fastening element with external threads is screwed into the internal thread of the anchor member. As a result, the anchor member held in place by the hardenable mass must provide a corresponding counter-torque so that the anchor member does not turn with the fastening element. To prevent turning of the anchor member, in a known embodiment the anchor member is secured in the hardenable mass by deformed areas on its peripheral surface and the deformed areas are also provided with outlet openings for the hardenable mass. Such deformed areas are sufficient for affording a positive lock in the axial direction of the anchor member with the hardenable mass. With regard to the prevention of rotation of the anchor member, such individual deformed areas have not been effective. If stress is applied to the anchor member very shortly after it is inserted into the mass and while the mass is not completely hardened, the required anchoring value can not be attained.

In the known anchor member the individual deformed areas are relatively deep so that an adequate contact between the anchor member and the hardenable mass in the region of the deformed areas is not always possible.

SUMMARY OF THE INVENTION

Therefore, the primary object of the present invention is to provide an anchor member fixable in a permanently hardenable mass, which can be fabricated and installed in a simple manner and, in addition, affords good anchoring values.

In accordance with the invention, the anchor member is deformed inwardly so that it has a multi-sided inside cross-section.

The cross section within the anchor member in the region of the deformed areas can be polygonally shaped, for instance, the cross-section can be three, four, six, or eight-sided. The deformation of the anchor member is relatively simple and can be effected after rolling the anchor member from a sheet metal blank. For production reasons it is preferable if the deformed areas provide the four-sided cross-section. A four-sided cross-section has the advantage, as compared to a three-sided cross-section, that the required deformation of the anchor member is small and two oppositely disposed jaws can be used in carrying out the deformation operation. A four-sided cross-section enables the absorption of high torques and axial stresses.

The deformed areas can, in principle, be dimensioned randomly. Since the anchor member must support axially applied loads as well as torque, it is advantageous that the axial length of the deformed areas is in the range of 0.2 to 0.5 times the external diameter of the anchor member. Such dimensions ensure that the loads acting in the axial direction can be distributed to a sufficient number of shoulders formed by the deformed areas.

Further, the axial spacing of the deformed areas can also be chosen randomly. The axial spacing of the individual deformed areas and the overall axial length of the anchor member, however, limit the number of the deformed areas. To attain the maximum anchor values it is appropriate that the axial spacing between the deformed areas is in the range of 0.3 to 0.5 times the outside diameter of the anchor member. The spacing and the axial length of the deformed areas can be varied along the axial direction of the anchor member.

The anchor member embodying the present invention, as is the case with anchor members equipped with external threads, is driven into the hardenable mass previously injected into the borehole. As a result, the hardenable mass is pressed outwardly into existing cavities within the borehole and it also flows toward the entrance to the borehole. To assure adequate contact of the anchor member with the hardenable mass, it is advantageous that the depth of the deformed or recessed areas diminishes toward the trailing end of the anchor member. Thus, the deformed areas with the greatest depth are located in the region of the bottom of the borehole while the deformed areas with smaller depths are located toward the trailing end of the anchor member. As mentioned above, preferably the anchor member is driven into the hardenable mass previously introduced into the borehole. To prevent penetration of the mass into the anchor member for avoiding contamination of the member, it is suitable that the leading end of the anchor member is closed. The closed leading end of the anchor member can be provided by bending over appropriate parts of the member or by the insertion of a stopper.

The anchor member can be provided with an external thread or other connection means. It is particularly advantageous, however, if the anchor member is provided with an inside thread adjacent its trailing end. Such an inside thread provides a variety of connection possibilities and it is well protected against damage.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a perspective view of an anchor member embodying the present invention;

FIG. 2 is a side view of the anchor member illustrated in FIG. 1 and shown partly in axially extending section; and FIG. 3 is a sectional view of the anchor member taken along the line III—III in FIG. 2.

DETAILED DESCRIPTION OF THE INVENTION

In FIGS. 1 to 3 an anchor member 1 is illustrated having a leading end 10 and a trailing end 11, that is, the leading end is inserted first into a borehole in which the anchor member is to be fixed by a permanently hardenable mass. The anchor member 1 is an axially elongated sleeve-like member and can be fabricated from rolled sheet metal so that it has a closed elongated seam 12 extending between the leading end 10 and the trailing end 11. When the anchor member 1 is inserted into a borehole in which the hardenable mass has already been injected, the leading end 10 of the sleeve-like member is closed. A flange 13 extending transversely of the axial direction of the anchor member 1 extends radially outwardly beyond the generally cylindrically shaped outside surface of the anchor member. Flange 13 serves as an abutment for limiting axial movement of the sleeve-like member 1 into a borehole. Axially adjoining the flange 13, the outside surface of the anchor member 1 has a necked-down portion 14. Between the necked down portion 14 and the leading end 10, the outside surface of the anchor body has four circumferentially extending deformed areas 16, 17, 18 and 19. There are four of these deformed areas spaced apart in a circumferential row around the anchor member and the inward deformation of the outside surface provides the inside surface with a rectangular or four-sided cross-section in the axially extending region of the deformed areas, note FIG. 3. As can be seen in FIGS. 1 and 3, the depth t of the deformed areas 16, 17, 18 and 19 decreases in the direction toward the trailing end 11 of the anchor member 1. This depth arrangement affords a better contact of the deformed anchor member 1 with the permanently hardenable mass previously injected into the borehole. The axial length b of the deformed areas 16, 17, 18 and 19 is about one-third of the outside diameter d of the anchor member. The spacing a of the deformed areas 16, 17, 18 and 19 in the axial direction of the anchor member 1 is about 0.4 times the outside diameter of the member. These dimensions can, however, vary.

It can be noted in FIG. 1 that the circumferential spacing of the deformed areas varies inversely with the depth t of the areas. In other words, the areas 19 are immediately adjacent one another in a circumferential direction while the remaining areas have an increasing circumferential spacing. As can be seen in FIG. 2, the axially spaced sides of the deformed areas 16, 17, 18 and 19 are in diverging relationship in the outward direction.

Preferably, the anchor member or sleeve-like member 1 is formed of sheet metal. Where smaller stresses are involved and when corrosion-prone conditions are present, the anchor member 1 can be formed of a plastics material.

While specific embodiments of the invention have been shown and described in detail to illustrate the application of the inventive principles, it will be understood that the invention may be embodied otherwise without departing from such principles.

We claim:

1. An anchor member to be fixed in a borehole by a permanently hardenable mass comprising an axially elongated sleeve-like member having a first end and a second end and a generally cylindrically shaped inside surface and outside surface, said outside surface has at least two recessed areas extending in the circumferential and axial direction and said recessed areas being spaced apart in the axial direction of said sleeve-like member by said cylindrically shaped outside surface, wherein the improvement comprises that each of said recessed areas is deformed inwardly from the generally cylindrically shaped outside surface and has a plurality of planar base surfaces extending chordally of the axis of said sleeve-like member and arranged in series one following the other in the circumferential direction with adjacent said planar base surfaces in the circumferential direction extending angularly relative to one another, said deformed recessed areas inwardly of said planar base surfaces have inner planar surfaces in the inside surface in said sleeve-like member deformed inwardly from said generally cylindrically shaped inside surface with the inner planar surfaces at said recessed areas forming at least two multi-planar sided cross-sections in the axially extending region of the recessed areas spaced axially apart by said cylindrically shaped inside surface and with each of the inner planar surfaces of said cross-sections extending generally parallel with a corresponding one of said planar base surfaces, in the axially extending region of said deformed recessed areas the inside said cross-sections of said sleeve-like member have a generally rectangular cross-section extending transversely of the axial direction of said sleeve-like member, the first end of said sleeve member is the leading end which is inserted first in to a borehole and the second end is the trailing end, the maximum depth of the deformed recessed areas inwardly from the generally cylindrically shaped outside surface of said sleeve-like member decreases in the axial direction from the first end to the second end of said sleeve-like member, and said sleeve-like member is closed at the first end thereof and is imperforate between the first and second ends for preventing the flow of the hardenable mass inside said member.

2. An anchor member, as set forth in claim 1 wherein has a thread formed in the inside surface therein adjacent the second end thereof.

3. An anchor member, as set forth in claim 1 wherein the axial length of the deformed recessed areas is in the range of approximately 0.2 to 0.5 times the outside diameter of the generally cylindrically shaped outside surface of said sleeve-like member.

4. An anchor member, as set forth in claim 3, wherein the axial spacing between said deformed recessed areas is in the range of 0.3 to 0.5 times the outside diameter of the generally cylindrically shaped outside surface of said sleeve-like member.

5. An anchor member, as set forth in claim 1 wherein said sleeve-like member has an annular radially inwardly deformed section extending from the second end thereof toward the adjacent deformed recessed area and the inside surface of said annular radially inwardly deformed section is generally cylindrically shaped and contains an inside thread.

* * * * *